(12) United States Patent
Bensmann et al.

(10) Patent No.: US 7,758,099 B2  
(45) Date of Patent: Jul. 20, 2010

(54) CONVERTIBLE VEHICLE WITH A SEPARATELY MOVEABLE REAR WINDOW

(75) Inventors: Heiner Bensmann, Georgsmarienhutte (DE); Heiko Pohlmann, Osnabruck (DE); Holger Plettendorf, Hagan A.t.w. (DE)

(73) Assignee: Wilhelm Karmann GmbH, Osnabruck (DE)

( * ) Notice: Subject to any disclaimer, the term of this patent is extended or adjusted under 35 U.S.C. 154(b) by 177 days.

(21) Appl. No.: 11/910,653

(22) PCT Filed: Jan. 19, 2006

(86) PCT No.: PCT/DE2006/000069

§ 371 (c)(1),
(2), (4) Date: Feb. 21, 2008

(87) PCT Pub. No.: WO2006/105744

PCT Pub. Date: Oct. 12, 2006

(65) Prior Publication Data

US 2008/0157558 A1    Jul. 3, 2008

(30) Foreign Application Priority Data

Apr. 6, 2005  (DE) .................. 10 2005 015 678

(51) Int. Cl.
*B60J 7/12* (2006.01)

(52) U.S. Cl. ........................... 296/107.07; 296/213

(58) Field of Classification Search ............ 296/107.07, 296/107.12, 107.04, 146.14, 201, 213
See application file for complete search history.

(56) References Cited

U.S. PATENT DOCUMENTS

| 5,267,770 A | 12/1993 | Orth et al. |
| 6,145,909 A | 11/2000 | Staley et al. |
| 6,641,202 B2 | 11/2003 | Graf et al. |
| 6,886,880 B2 | 5/2005 | Heselhaus et al. |

*Primary Examiner*—Dennis H Pedder  
*Assistant Examiner*—Melissa A Black  
(74) *Attorney, Agent, or Firm*—Gifford, Krass, Sprinkle, Anderson & Citkowski, P.C.; Douglas L. Wathen

(57) ABSTRACT

A convertible vehicle includes a retractable top with a rear window laterally surrounded by flexible cover regions. The rear window is movable relative to the cover regions. The top has flexible and tensionable loose material portions that forms a water pockets for sealing between the cover regions and the sides of the rear window. Each loose material portion has a lower end fixed to a material holding hoop disposed beneath the rear window. The material holding hoop has a holding opening through which a part of the loose material portion extends.

13 Claims, 7 Drawing Sheets

CONVERTIBLE VEHICLE WITH A SEPARATELY MOVEABLE REAR WINDOW

REFERENCE TO RELATED APPLICATIONS

This application is the U.S. national phase of PCT/DE2006/000069, filed 19 Jan. 2006, which claims priority from application No. DE 10 2005 015 678.9, filed 6 Apr. 2005, the entire content of both of which are incorporated herein by reference.

FIELD OF THE INVENTION

The invention relates to a convertible vehicle with a rear window which is surrounded at least at its sides by flexible cover regions and is relatively moveable with respect to them on the opening or closing of the roof.

BACKGROUND OF THE INVENTION

A convertible vehicle having a soft top with a flexible roof cover is known from DE 100 29 471 B4 which has a rear window with a large viewing region. For this purpose, the rear window extends downwardly to a material holding hoop bounding the roof when the roof is closed. Since the holding hoop is moved upwardly during opening of the roof and thus approaches a rearmost loop disposed above the rear window when the roof is closed, the space available for the rear window between the material holding hoop and the rearmost loop is reduced in size during roof movement. To avoid a collision between one of these parts and the rear window, the rear window is moveable with respect to cover regions disposed to the side thereof and its lower edge can project over the material holding hoop during roof movement. To avoid water externally located or acting on the roof cover or rear window from being able to penetrate into the passenger compartment, at least the space between the lateral cover regions and the rear window must be sealed. For this purpose, a flexible and tensionable loose material portion is provided, which is frequently also called a water pocket. A sealing problem occurs in the near zone of the material holding hoop in which a lateral frame of the rear window has already terminated and the water pocket extends there without any direct contact to the rear window.

It remains desirable to improve the sealing in rear windows that are moveable with respect to surrounding material regions.

SUMMARY OF THE INVENTION

According to one aspect of the invention, a convertible vehicle includes a retractable top having a rear window that is laterally surrounded by flexible cover regions and is movable relative to the cover regions. The top has a flexible and tensionable loose material portion that forms a water pocket for sealing between the cover regions and the rear window. The loose material portion has a lower end attached to a material holding hoop disposed below the rear window and the material holding hoop has a holding opening through which a part of the loose material portion extends.

By this arrangement, water collected between and the rear window and the lateral cover reliably is downwardly drained into the holding openings, a penetration of water into the passenger compartment is prevented.

If the holding opening is located at the lower end of an inner side edge of the loose material portion with respect to the transverse vehicle direction and close to the lateral edge of the rear window, water located at this innermost end of the water pocket is prevented from running further inwardly in the direction of the passenger compartment. The water is instead fully drained downwardly.

The holding opening not only forms a holder for the water pocket, but also an introductory opening for the water drained from the loose material portion. The water can then penetrate downwardly into the hoop and can drain downwardly from there.

A barrier against further movement of water towards a vertical longitudinal central plane may be provided by a thickened edge, whereby the water located the water pocket is prevented from running further inwardly into a free region no longer covered by the rear window during the roof movement. The water is blocked by the edge and is thereby, drained off downwardly.

In one embodiment, the thickened edge is formed by a folded over edge region of the material portion, thereby forming a cavity, through which a cord of flexible material, for example foam rubber or similar, may be pulled for thickening. The flexible material is elastic and is, therefore, able to be tensioned by the material holding hoop.

Provided the marginal block opens into the holding opening of the material holding hoop and the thickened portion extends through the holding opening, an flow of water running toward the inner edge of the water pocket into the material holding hoop is ensured. The thickened edge forms a water guide into the holding opening and can simultaneously also be tensioned by the material holding hoop.

Advantages of the present invention will he readily appreciated as the same becomes better understood by reference to the following detailed description when considered in connection with the accompanying drawings.

DETAILED DESCRIPTION OF THE INVENTION

Figure 1:
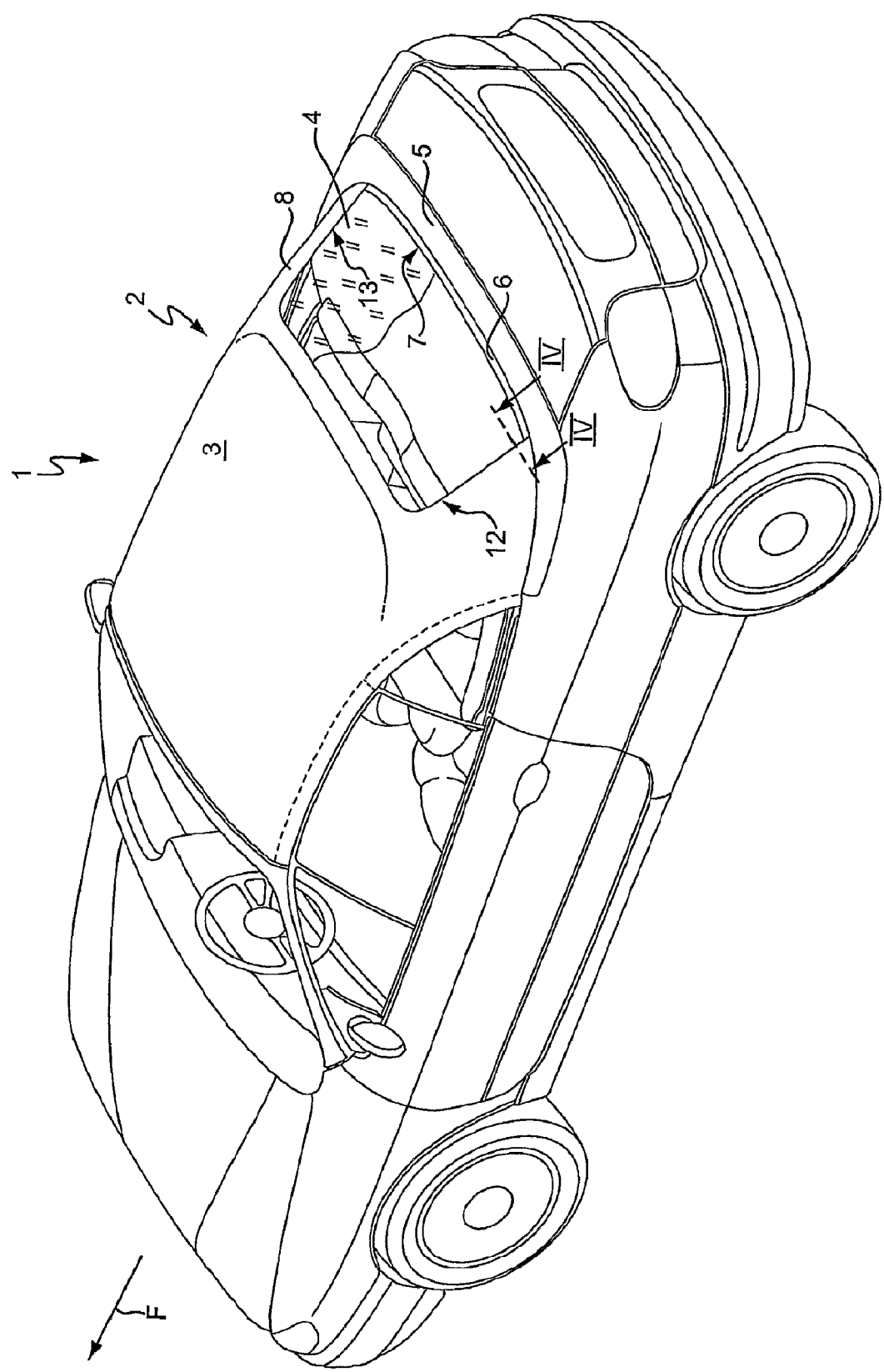
FIG. 1 is a perspective view of a convertible vehicle in accordance with the invention obliquely from above and behind with a closed roof.

The partially convertible or fully convertible vehicle 1 in accordance with one embodiment of the invention includes a roof 2 having a flexible roof cover 3 at least in its rear portion, with a rear window 4.

The vehicle 1 can be either a two-seater or have a larger interior space with two or more seating rows behind one another.

The roof 2 is at least partly moveable and can be stowed partially or completely in the rearward vehicle region when opened. In the illustrated embodiment, a cover part 5 is provided on the vehicle 1 and is moveable with respect to the car body. A rearward roof region extends up from the cover part 5 when the roof is closed. A material holding hoop 6 rearwardly bounds the roof 2 and tensions the cover 3. The cover part 5 may be closed above a roof receiving space with the roof 2 opened.

The rear window 4 is not fixedly connected to the material holding hoop 6 at its lower rim 7, but rather seals to it directly or indirectly when the roof 2 is closed.

Figure 2:
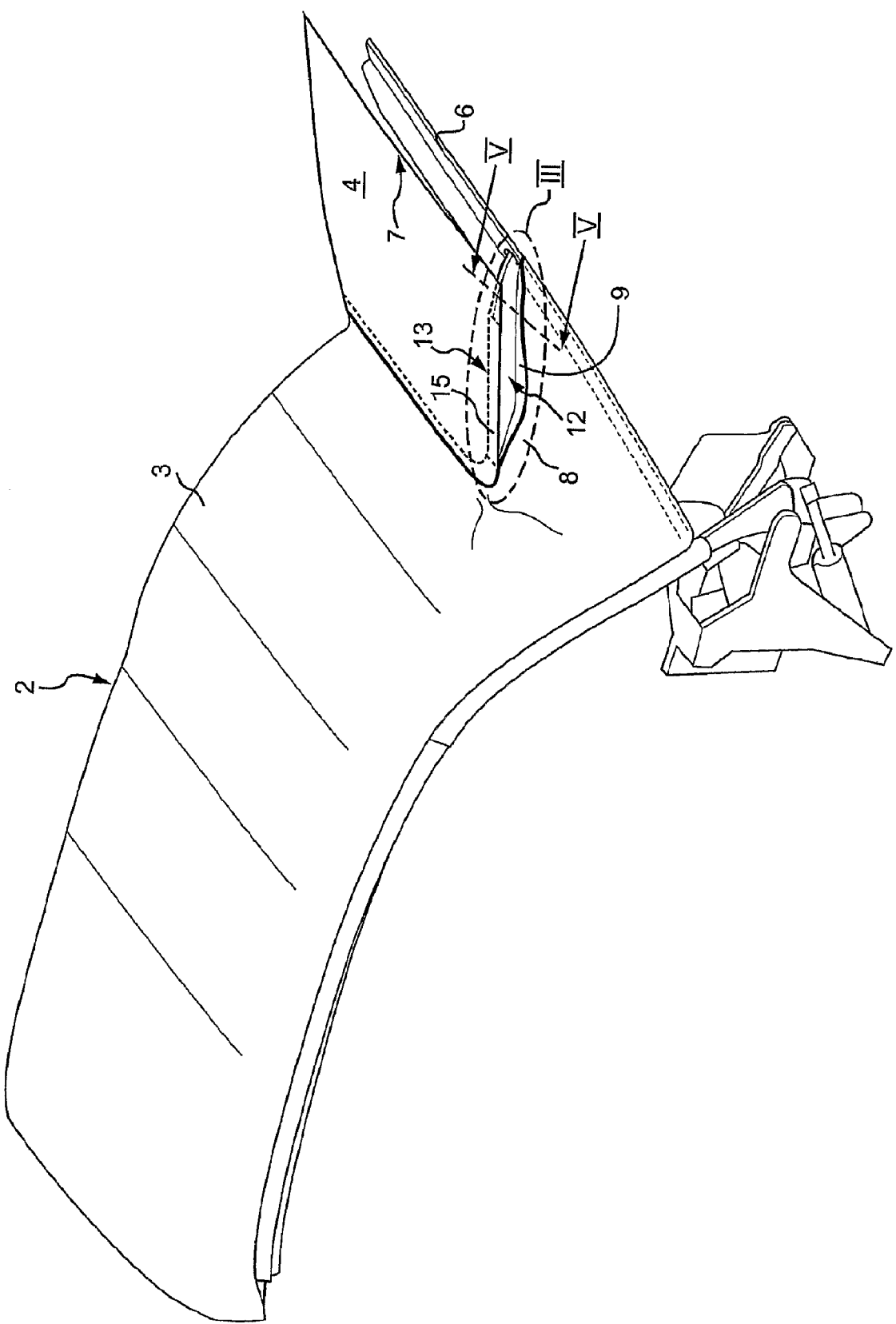
FIG. 2 is a view of the opening roof with an upwardly pivoted material holding hoop from a similar perspective to FIG. 1.
Figure 3:
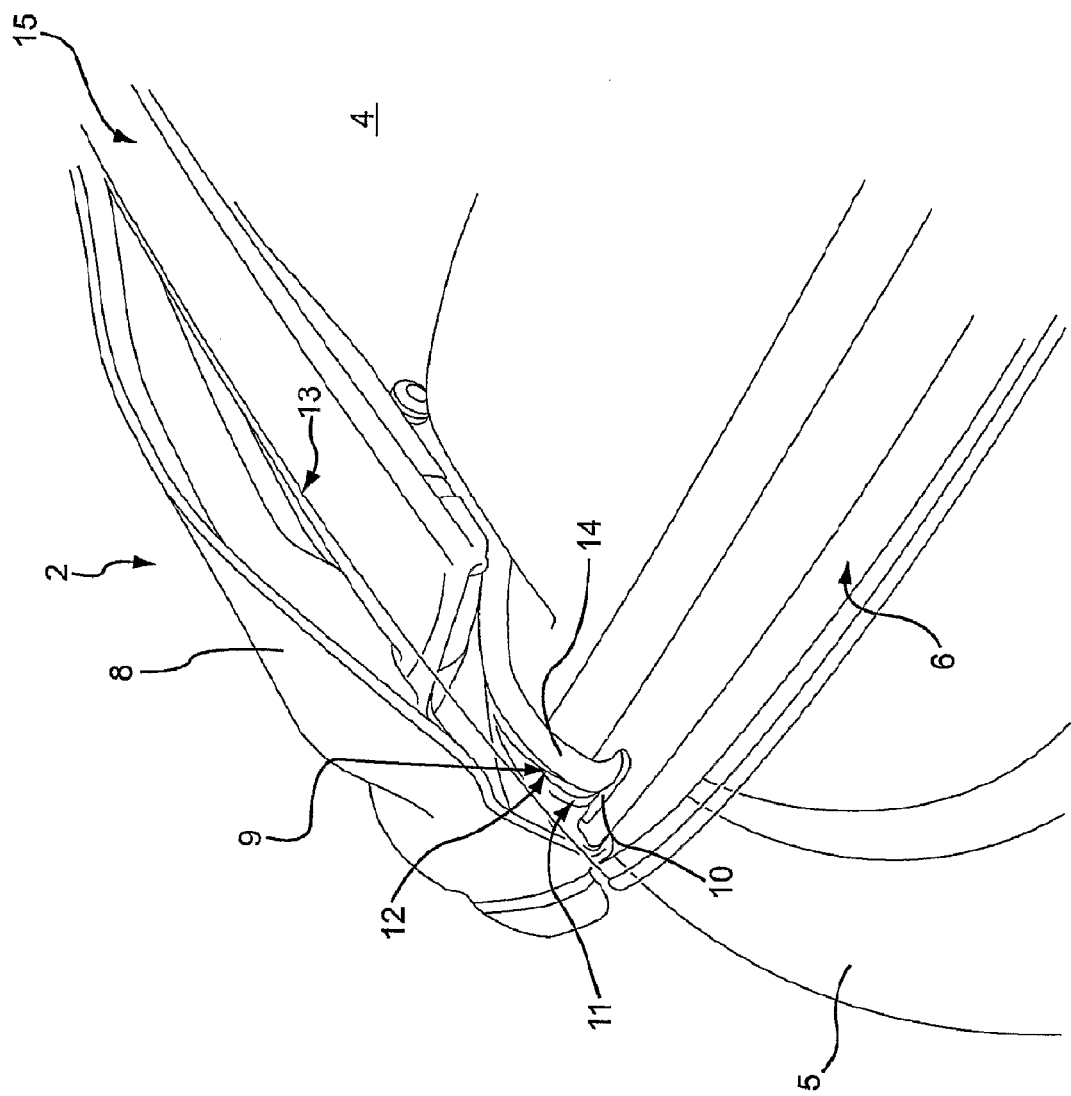
FIG. 3 is a detailed view approximately of the detail III in FIG. 2 from a rotated perspective with a direction of view facing to the front left.
Figure 4:
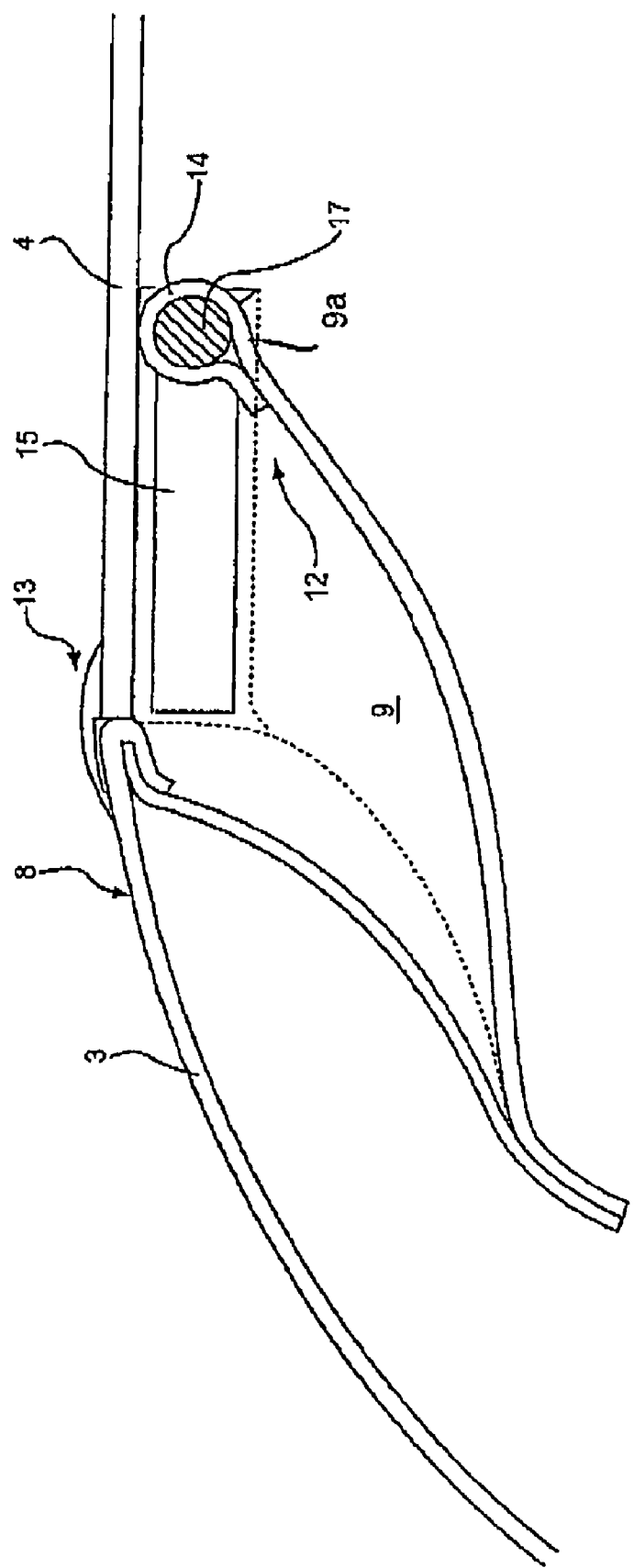
FIG. 4 is a sectional representation approximately corresponding to the line IV-IV in FIG. 1, that is with a closed roof.

The material holding hoop 6 pivots upwardly as the roof (FIG. 2, FIG. 3) is opened. The rear window 4 releases from the hoop 6 and its lower rim 7 extends over the hoop 6 as the roof is opened. After sufficient upward pivoting of the material holding hoop 6, the cover part 5 can open so that the roof 2 can then be lowered.

Figure 5:
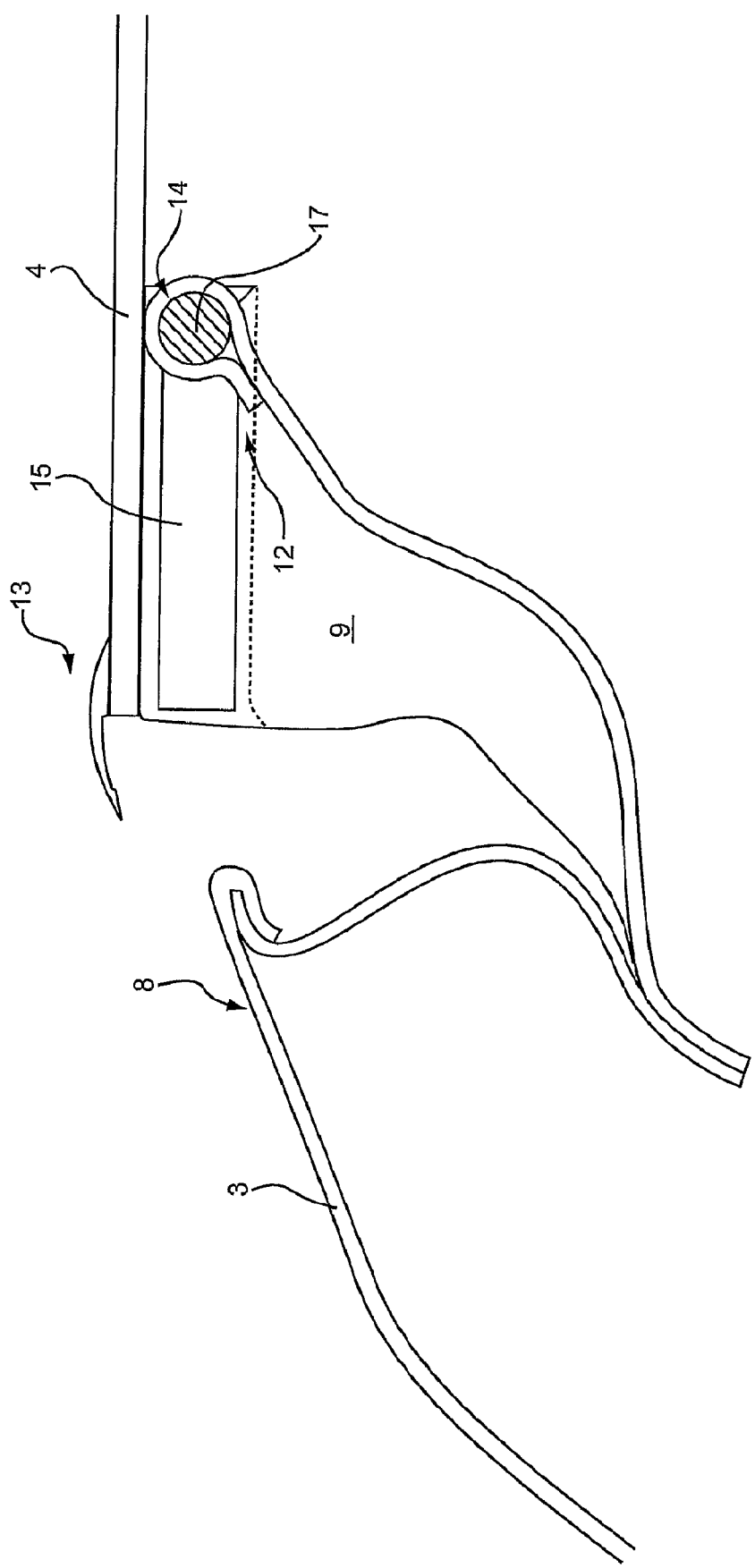
FIG. 5 is a sectional representation approximately corresponding to the line V-V in FIG. 2, that is during the opening of the roof.
Figure 6:
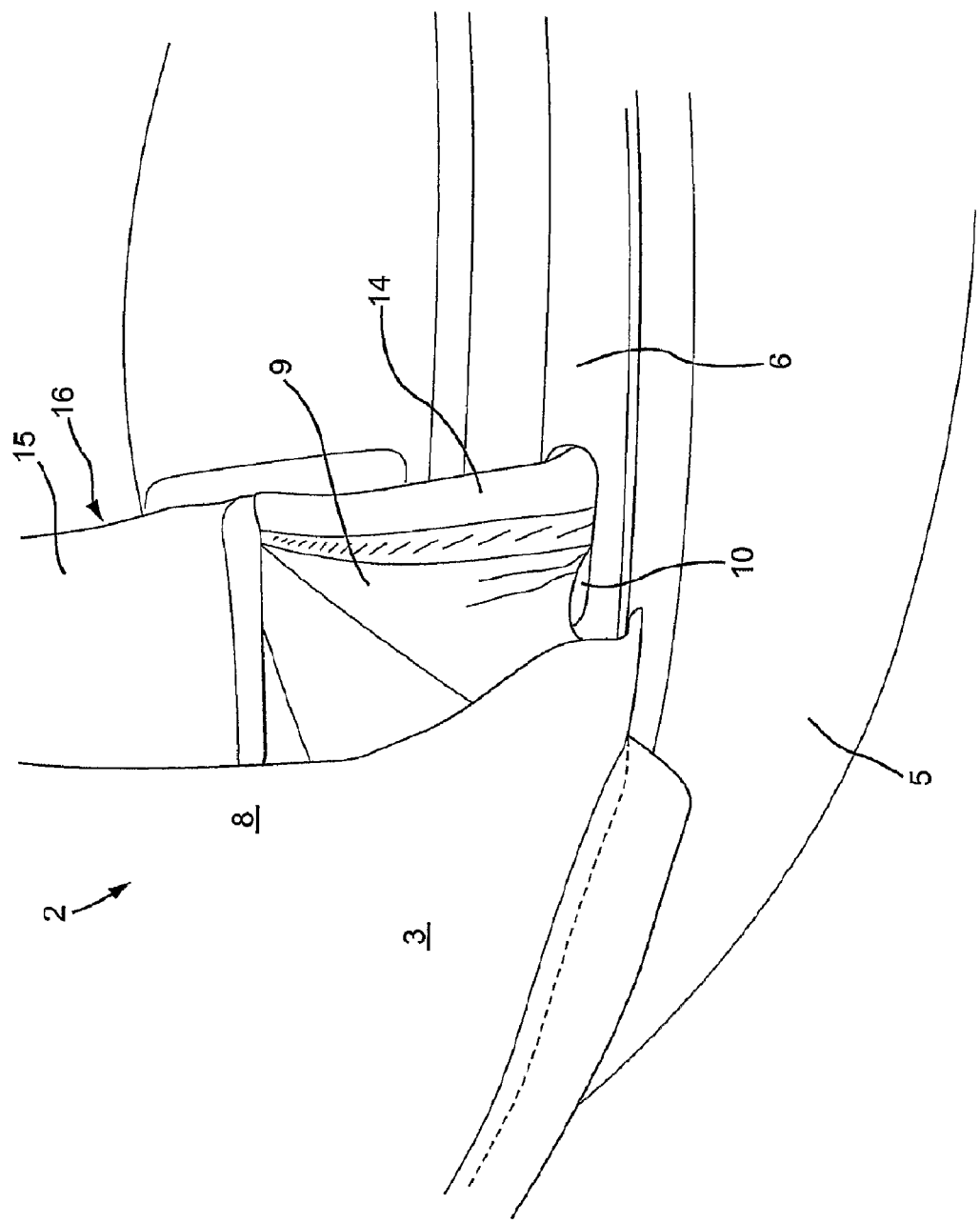
FIG. 6 is a detailed view of the left hand lower marginal region of the opening for the rear window (window not shown)

To release the rear window 4 from the material holding hoop 6, the rear window 4 may be guided laterally along correspondingly shaped cam tracks or, for example, by a multi joint mechanism. The rear window 4 also releases itself from the laterally surrounding regions 8 of the cover 3 toward the top in a relative movement, when the roof (FIG. 3, FIG. 5) is opened. Therefore, when the material holding hoop is deployed, the lower edge 7 of the rear window can be moved beyond the material holding hoop.

To seal the openings which form between the rear window 4 and the cover regions 8, a flexible and tensionable loose material portion or water pocket 9 is provided respectively at each side. The water pocket 9 can, for example, comprise one or more material webs which can, for instance, be rubberized or impregnated to repel water. It can also fully consist of a flexible material.

The water pocket 9 has a lower end fixed to the material holding hoop 6 which extends beneath the rear window 4 when the roof 2 is closed, such that the water pocket extends into the material holding hoop. For this purpose, the material holding hoop 6 has a slot-like cut-out 10 on its upper side as a holding opening for a part 11 of the loose material portion 9 extending through the holding opening. This part 11 is fastened, for example riveted from below, to the hoop 6 beneath the holding opening 10 in a visually unobtrusive manner.

The two holding openings 10 are located generally symmetrically on the material holding hoop 6 beneath the inner side edges 12 of the loose material portion 9 with respect to the transverse direction of the vehicle, and close to the side edges 13 of the rear window 3. The inner side edges 12 extend into the holding openings 10 and can be tensioned by them when of the material holding hoop 6 is lowered.

Each loose material portion 9 is provided with a thickened edge 14 at its inner side edge 12, with respect to the transverse direction of the vehicle, and close to the side edge 13 of the rear window 4. The thickened edge 14 extends parallel to the edge 12 and forms a downwardly facing guide for water to be kept away from the water pocket 9. The water is prevented from overflowing towards the center of the vehicle by this thickened edge 14 and is drained off downwardly in the direction of the material holding hoop 6.

The thickened edge 14 can be formed in one piece with the loose material portion 9 by folding over a marginal region 9a of the material portion 9 to form a loop. A cord 17 of flexible material, for example of foam rubber, which has substantial flexibility and elasticity, may be disposed in the cavity formed by the folded over marginal region 9a. Alternatively, the can be formed by a separate part, for instance a plastic portion, which can, in turn, be fixedly secured to the loose material portion 9.

The thickened edge 14 also extends into the holding opening 10 of the material holding hoop 6 and is positioned at the end of the opening 10 towards the vehicle center. The diameter of the thickened edge 14 generally corresponds to the width of the holding opening 10 in the longitudinal vehicle direction. An end of the opening 10 is substantially filled by the thickened edge 14 which is fixed beneath the holding opening to the material holding hoop 6 either indirectly via an adjacent material region of the water pocket 9 or directly via itself.

Figure 7:
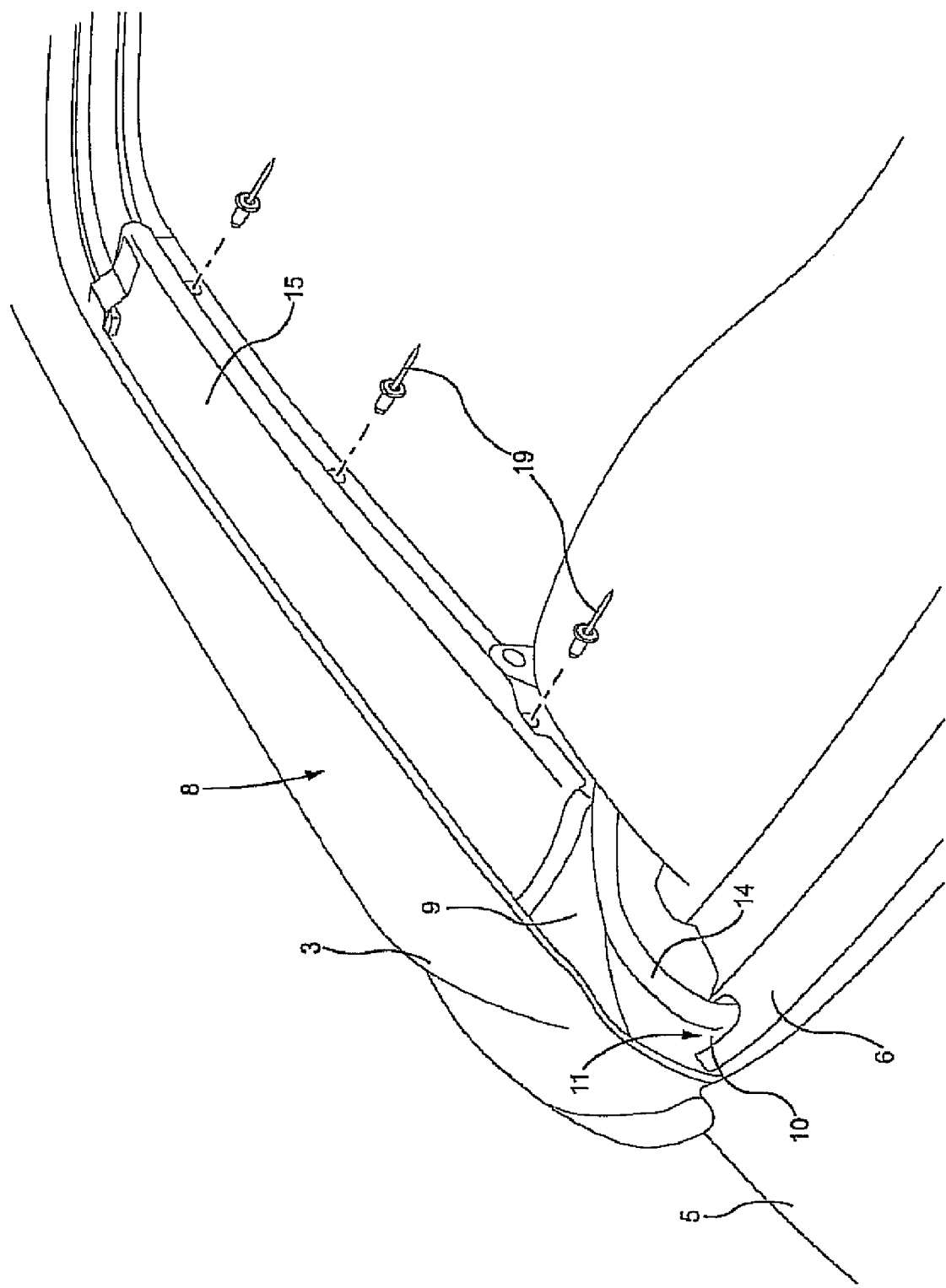
FIG. 7 is a view of the left hand marginal region of the opening for the rear window (window not shown) from a similar view as in FIG. 3 with additionally drawn fastening means for the water pocket.

As illustrated in FIG. 4 to FIG. 7, the sides of the rear window 4 lie on co-moveable frame parts 15 which extend longitudinally and are covered by the loose material portion so that the loose material portion 9 is disposed between the rear window 4 and the frame part 15. Since the water pocket 9 extends outwardly in one part from here, water collecting directly at the rim of the rear window 4 during movement of the roof 2 is also drained off outwardly and downwardly and does not find any way to infiltrate the rear window. The loose material portion 9 furthermore covers the frame part 15 and is fixed on its inwardly facing side. A plurality of rivets 19 for this purpose are shown in FIG. 7. Adhesion is also additionally or alternatively possible.

The invention has been described in an illustrative manner. It is, therefore, to be understood that the terminology used is intended to be in the nature of words of description rather than of limitation. Many modifications and variations of the invention are possible in light of the above teachings. Thus, within the scope of the appended claims, the invention may be practiced other than as specifically described.

We claim:

1. A convertible vehicle comprising:
a retractable top having a rear window laterally surrounded by flexible cover regions and relatively movable with respect to the cover regions, the rear window having sides;
the top having a flexible and tensionable loose material portion that forms a water pocket for sealing between the cover regions and the sides of the rear window; and
each loose material portion having a lower end fixed to a material holding hoop disposed beneath the rear window, the material holding hoop having a holding opening through which a part of the loose material portion extends.

2. A convertible vehicle in accordance with claim 1, wherein the loose material portions each have an inner side edge with respect to the transverse direction of the vehicle, each holding opening being located at a lower end of one of the inner side edges of the loose material portion and close to a side of the rear window.

3. A convertible vehicle in accordance with claim 1, wherein the holding opening forms an opening for water drained off from the loose material portion.

4. A convertible vehicle in accordance with claim 1, wherein the loose material portion has a thickened edge at its inner side edge and close to a side of the rear window.

5. A convertible vehicle in accordance with claim 4, wherein the thickened edge includes a folded over marginal region of the material portion.

6. A convertible vehicle in accordance with claim 5, wherein the thickened edge includes a cord of flexible material disposed in a cavity of the folded over marginal region.

7. A convertible vehicle in accordance with claim 4, wherein the thickened edge extends into the holding opening of the material holding hoop.

8. A convertible vehicle in accordance with claim 7, wherein the thickened edge is fixed to the material holding hoop beneath the holding opening.

9. A convertible vehicle in accordance with claim 1, further comprises a frame portion extending beneath the rear window, the loose material portions extending between the frame portion and the rear window.

10. A convertible vehicle comprising:
  a retractable top having a flexible cover and an opening formed in the cover, the opening in the cover extending between spaced apart side edges of the cover, the cover having a tensionable loose material portion that forms a water pocket extending along each side edge of the cover,
  the cover having a thickened edge extending along an inner side of the loose material portion to form a seal with a side of a rear window and prevent water penetration therebetween,
  the top having a material holding hoop that extends beneath the rear window, the material holding hoop having a holding opening that receives a part of the loose material portion therethrough allowing water collected in the water pocket to pass to the material holding hoop.

11. A convertible vehicle in accordance with claim 10, wherein the thickened edge extends along an inner side of the loose material portion with respect to the transverse direction of the vehicle and is close to said side of the rear window.

12. A convertible vehicle in accordance with claim 10, wherein the thickened edge includes a folded over edge region of the loose material portion.

13. A convertible vehicle in accordance with claim 12, wherein a tensioning cord is disposed in the folded over edge region.

* * * * *

UNITED STATES PATENT AND TRADEMARK OFFICE
CERTIFICATE OF CORRECTION

PATENT NO. : 7,758,099 B2  Page 1 of 2
APPLICATION NO. : 11/910653
DATED : July 20, 2010
INVENTOR(S) : Heiner Bensmann et al.

It is certified that error appears in the above-identified patent and that said Letters Patent is hereby corrected as shown below:

Column 1, lines 61-64 should read:

By this arrangement, water collected between [[and]] the rear window and the lateral cover reliably is downwardly drained into the holding openings, a penetration of water into the passenger compartment is prevented.

Column 2, lines 10-16 should read:

A barrier against further movement of water towards a vertical longitudinal central plane may be provided by a thickened edge, whereby the water located in the water pocket is prevented from running further inwardly into a free region no longer covered by the rear window during the roof movement. The water is blocked by the edge and is thereby, drained off downwardly.

Column 2, lines 23-29, should read:

Provided the marginal block opens into the holding opening of the material holding hoop and the thickened portion extends through the holding opening, [[an]] a flow of water running toward the inner edge of the water pocket into the material holding hoop is ensured. The thickened edge forms a water guide into the holding opening and can simultaneously also be tensioned by the material holding hoop.

Column 3, lines 46-52 should read:

The two holding openings 10 are located generally symmetrically on the material holding hoop 6 beneath the inner side edges 12 of the loose material portion 9 with respect to the transverse direction of the vehicle, and close to the side edges 13 of the rear window 3. The inner side edges 12 extend into the holding openings 10 and can be tensioned by them when [[of]] the material holding hoop 6 is lowered.

Signed and Sealed this

Fifth Day of October, 2010

David J. Kappos
*Director of the United States Patent and Trademark Office*

CERTIFICATE OF CORRECTION (continued)
U.S. Pat. No. 7,758,099 B2

Column 3, line 62 through column 4, line 3 should read:

The thickened edge 14 can be formed in one piece with the loose material portion 9 by folding over a marginal region 9a of the material portion 9 to form a loop. A cord 17 of flexible material, for example of foam rubber, which has substantial flexibility and elasticity, may be disposed in the cavity formed by the folded over marginal region 9a. Alternatively, the <u>thickened edge</u> can be formed by a separate part, for instance a plastic portion, which can, in turn, be fixedly secured to the loose material portion 9.